(12) United States Patent
Hori

(10) Patent No.: US 7,195,388 B2
(45) Date of Patent: Mar. 27, 2007

(54) LIGHT SOURCE DEVICE AND PROJECTOR APPARATUS HAVING SAME

(75) Inventor: Masahiro Hori, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 94 days.

(21) Appl. No.: 11/007,672

(22) Filed: Dec. 8, 2004

(65) Prior Publication Data
US 2005/0122721 A1 Jun. 9, 2005

(30) Foreign Application Priority Data
Dec. 9, 2003 (JP) .............................. 2003-410558

(51) Int. Cl.
*F21V 9/06* (2006.01)
*G03B 21/14* (2006.01)

(52) U.S. Cl. ...................... 362/583; 362/268; 362/293; 362/253; 353/22; 353/84

(58) Field of Classification Search ................ 362/268, 362/253, 261, 293, 311, 551, 552, 583, 558; 352/198, 203; 353/22, 23, 24, 34, 84; 359/443, 359/448, 449
See application file for complete search history.

(56) References Cited
U.S. PATENT DOCUMENTS
3,922,085 A * 11/1975 Sheets .......................... 355/71

| 5,567,031 A | * | 10/1996 | Davenport et al. .......... 362/551 |
| 7,025,475 B2 | * | 4/2006 | Yamazaki et al. ........... 362/293 |
| 2004/0156212 A1 | * | 8/2004 | Kamijima ..................... 362/551 |

FOREIGN PATENT DOCUMENTS

| JP | 2000-348532 | * | 12/2000 |
| JP | 2000-348532 A | | 12/2000 |
| JP | 2001-023430 A | | 1/2001 |

* cited by examiner

*Primary Examiner*—Sandra O'Shea
*Assistant Examiner*—Bao Q. Truong
(74) *Attorney, Agent, or Firm*—Frishauf, Holtz, Goodman & Chick, P.C.

(57) ABSTRACT

According to the present invention, there is provided a light source device having a reflector including a light source lamp and an opening for emitting light for reflecting light radiated from the light source lamp arranged within the reflector to emit the light from the opening, and a glass arranged ahead of the opening of the reflector inclinedly by a predetermined angle with respect to a plane perpendicular to the optical axis of light emitted from the reflector. According to the light source device, the light source lamp is prevented from temperature rise and consequent overheat caused by light reflected on the glass thereby to return into the reflector.

10 Claims, 8 Drawing Sheets

LIGHT SOURCE DEVICE AND PROJECTOR APPARATUS HAVING SAME

BACKGROUND OF THE INVENTION

1. Field of the Invention

The present invention relates to a light source device and a projector apparatus having the same.

2. Description of the Related Art

A light source device used for a projector or the like includes a light source lamp, a reflector having an opening for emitting light for reflecting light radiated from the light source lamp arranged within the reflector to emit the light from the opening, a transparent late such as an explosion-proof glass (glass for preventing damages on the device due to explosion of the light source lamp) arranged ahead of the opening of the reflector, etc. (see Unexamined Japanese Patent Application KOKAI Publication No. 2001-23430).

However, in the light source device in which the transparent plate such as an explosion-proof glass is arranged ahead of the opening of the reflector, although most of light reflected on the reflector and emitted from the opening of the reflector passes through the transparent plate to be emitted from the light source device, some of the light is reflected on the transparent plate, returns into the reflector and converges on the light source lamp. Therefore, there is a problem that the light source lamp causes temperature rise not only by its heat generation by light radiation, but also by the convergence of the returning light reflected on the transparent plate, leading to an overheated state.

SUMMARY OF THE INVENTION

An object of the present invention is to provide a light source device in which a transparent plate is arranged ahead of an opening of a reflector and which nevertheless can prevent temperature rise and overheat of a light source lamp due to light, of the light emitted from the reflector, that is reflected on the transparent plate to return into the reflector, and a projector apparatus having the light source device.

A light source device according to a first aspect of the present invention comprises:

a light source lamp;

a reflector which has an opening for emitting light, and reflects light radiated from the light source lamp arranged within the reflector to emit the light from the opening; and a transparent plate which is arranged ahead of the opening of the reflector, obliquely inclinedly by a predetermined angle with respect to a plane perpendicular to an optical axis of the light emitted from the reflector.

A projector apparatus having a light source device according to a second aspect of the present invention comprises:

a light source device which includes: a light source lamp, a reflector having an opening for emitting light for reflecting light radiated from the light source lamp arranged within the reflector to emit the light from the opening; and a transparent plate arranged ahead of the opening of the reflector, the transparent plate being obliquely inclined by a predetermined angle with respect to a plane perpendicular to an optical axis of the light emitted from the reflector, a display element which displays an image by controlling emission of light coming thereto, an optical system which causes light emitted from the light source device to enter the display element, and a projection lens which projects light emitted from the display element on a projection surface.

A light source device according to a third aspect of the present invention comprises:

a light source lamp, a reflector which has an opening for emitting light, and reflects light radiated from the light source lamp arranged within the reflector so that the light is emitted from the opening so as to be converged;

a transparent plate which is arranged ahead of the opening of the reflector, and which is obliquely inclined by a predetermined angle with respect to a plane perpendicular to an optical axis of light emitted from the reflector such that it reflects light emitted from the reflector so as not to converge on the light source lamp.

In the light source device or the projector apparatus having the light source device according to the present invention, of light radiated from the light source lamp and reflected on the reflector to be emitted from the opening of the reflector, light reflected on the transparent plate is caused not to converge on the light source lamp, making it possible to prevent the light source lamp from temperature rise and overheat due to light reflected on the transparent plate thereby to return into the reflector.

BRIEF DESCRIPTION OF THE DRAWINGS

These objects and other objects and advantages of the present invention will become ore apparent upon reading of the following detailed description and the accompanying drawings in which.

DETAILED DESCRIPTION OF THE PREFERRED EMBODIMENT

Figure 1:
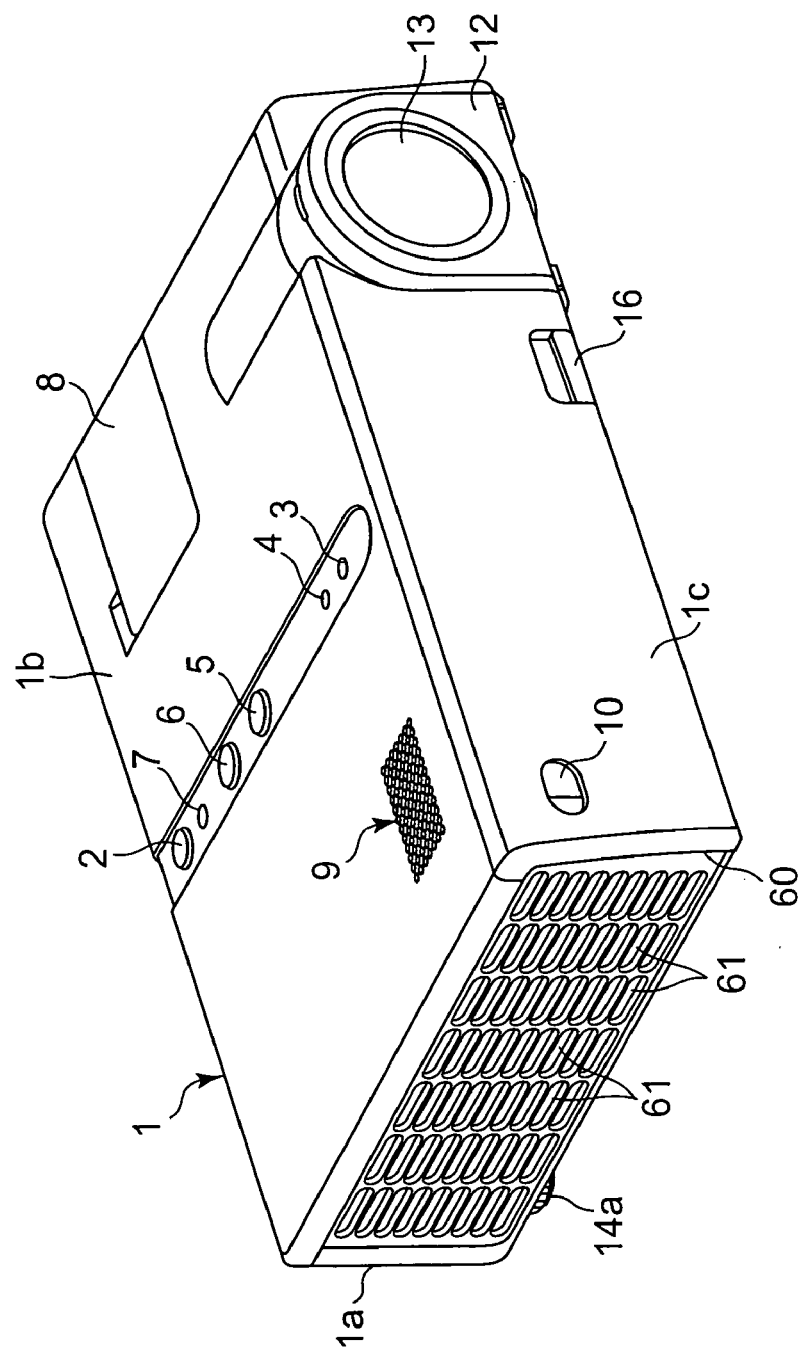
FIG. 1 is a perspective diagram of the appearance of a projector according to an embodiment of the present invention, and shows the projector's unused state.
Figure 2:
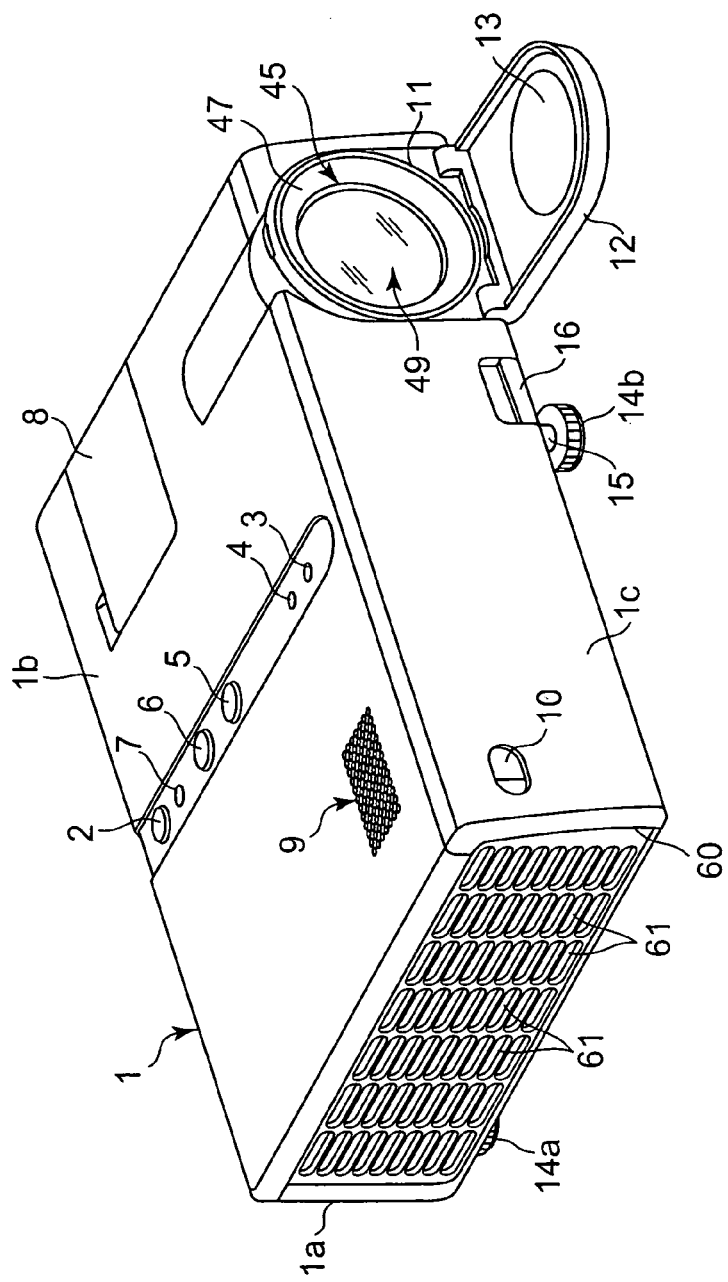
FIG. 2 is a perspective diagram of the appearance of the projector showing its used state.
Figure 3:
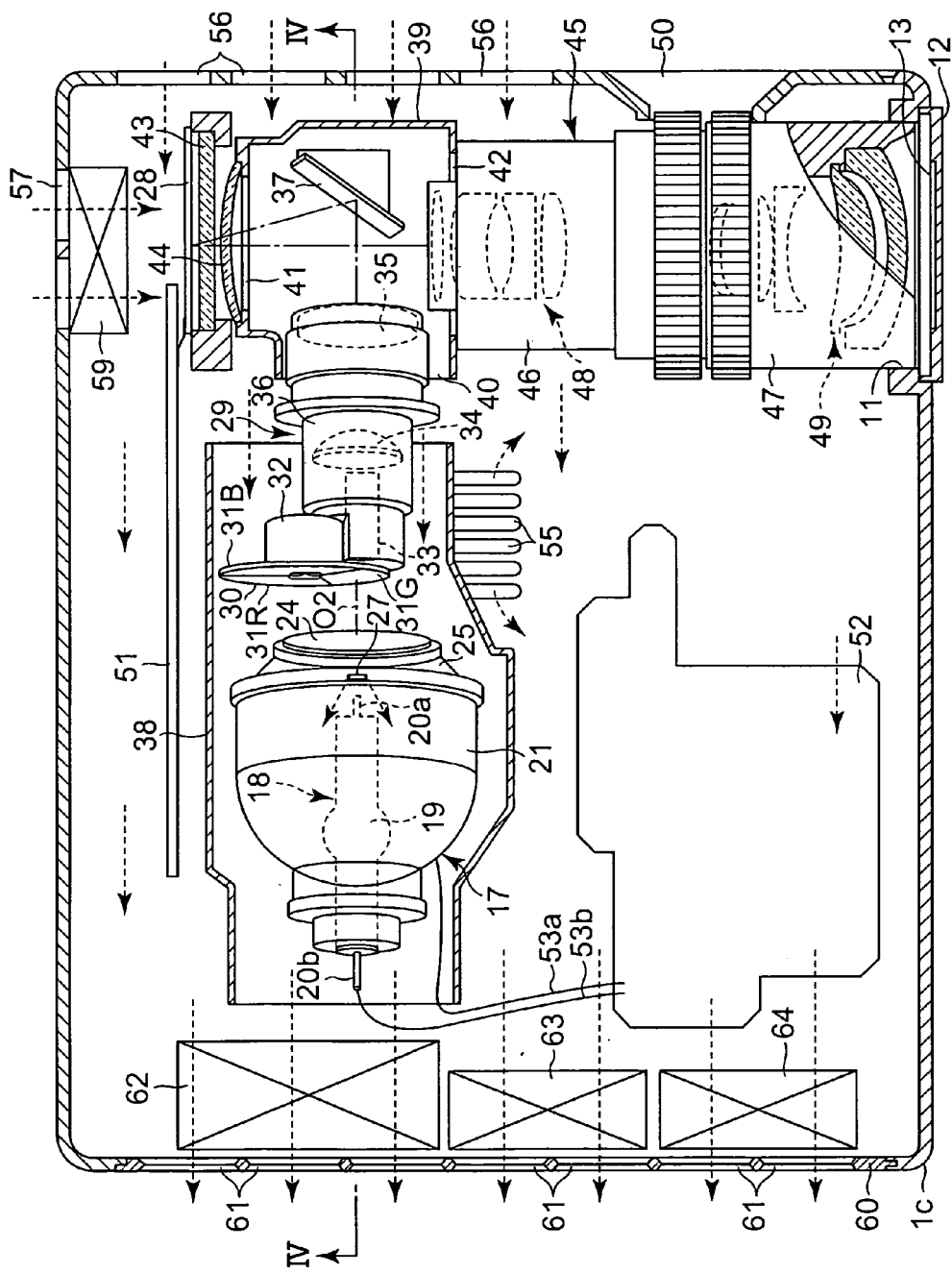
FIG. 3 is plan view of the projector seen as horizontally sectioned.
Figure 4:
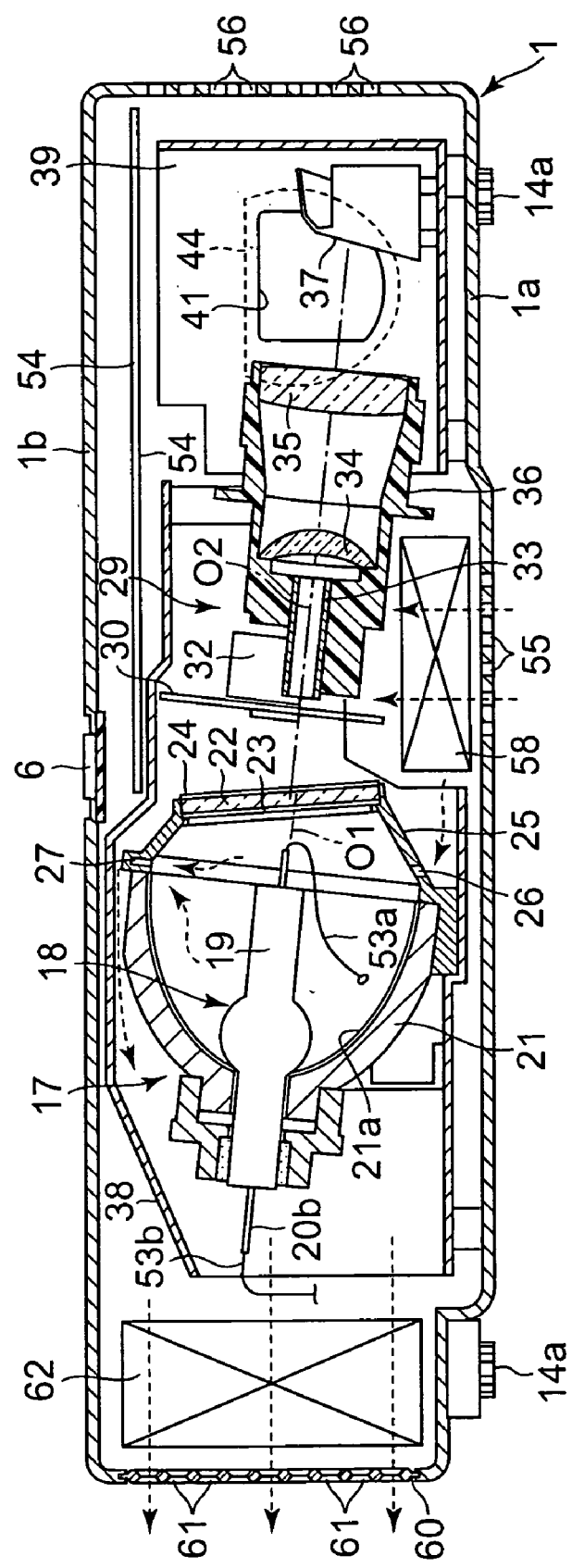
FIG. 4 is a cross section of the projector as sectioned along a line IV—IV of FIG. 3.

FIG. 1 to FIG. 6 show one embodiment of the present invention, where FIG. 1 and FIG. 2 are perspective diagrams of the appearance of a projector showing its unused state and used state, FIG. 3 is a plan view of the projector seen as horizontally sectioned, and FIG. 4 is a cross section of the projector as sectioned along a line IV—IV of FIG. 3.

The projector has a light source device 17 and a display area where a plurality of pixels are arranged in rows and columns like a matrix, placed within its projector case 1 whose plan view shape is rectangular. Within the projector case 1, there are further placed a display element 28 for displaying images by controlling emission of light which has entered the plurality of pixels, a light source side optical system 29 for causing light emitted from the light source device 17 to enter the display element 28, and a projection lens 45 for projecting light coming from the display element 28 to an unillustrated projection surface such as a screen.

The projector case 1 comprises a case body 1a, an upper panel 1b, and a front panel 1c. The case body 1a, the upper panel 1b, and the front panel 1c constitute the both side surfaces, the back surface, and the bottom surface of the projector case 1. Provided on the back surface of the projector case 1 are an USB (Universal Serial Bus) terminal for personal computer, an input terminal for color image signals and audio signals, a video signal input terminal, and a power source connector (none of these is illustrated).

Provided on the upper surface of the projector case 1 are a power source key 2, a lamp indicator 3, an overheat indicator 4, an automatic image quality adjusting key 5, a manual image quality adjusting key 6, a power/standby indicator 7, various adjusting keys (unillustrated), and a sound releasing section 9 for speaker.

The lamp indicator 3 indicates that the light source device 17 is turned on. The overheat indicator 4 indicates that the light source device 17 is overheated. The power/standby indicator 7 changes its indication colors depending on whether it is in a standby state where the power source connector is connected to a commercial power source, or it is in an on state where the power source key 2 is switched on.

A communication unit 10 for receiving an infrared signal from an unillustrated remote controller is provided on the front surface of the projector case 1.

A projection port 11 is provided at one edge portion of the front surface of the projector case 1. The projection port 11 has a projection lens cover 12 which can be opened/closed. The projection lens cover 12 has an opening at its center, which is provided with a semitransparent plate 13 having, for example, red color.

A pair of rear foot members 14a and a front foot member 14b are provided on the bottom surface of the projector case 1. The rear foot members 14a are provided as a pair of left and right members, at both edge portions of a rear region of the bottom surface of the projector case 1. The front foot member 14b is arranged at around the center of a front region of the bottom surface of the projector case 1 at a position slightly backed from the case front edge.

The rear foot members 14a and the front foot member 14b support the projector case 1 so that the projector case 1 turns upward obliquely with its front side held higher when the projector is used (for projection). The pair of rear foot members 14a are fixed to the lower end of unillustrated screw legs which are screwed at a bottom portion of the projector case 1. The front foot member 14b is fixed to the lower end of a rod leg 15, and is provided such that its height of protrusion from the case bottom surface can be adjusted. The rod leg 15 is held vertically slidably by an unillustrated leg lock mechanism which is provided inside the projector case 1.

The leg lock mechanism releases locking of the rod leg 15 when a lock releasing lug 16 provided on the front panel 16c is pressed downward. The leg lock mechanism automatically locks the rod leg 15 by a spring force when the lock releasing lug 16 is released from being pressed downward. When the projector is to be used, the projector case 1 can be supported in the aforementioned state of being turning upward obliquely, by pressing the lock releasing lug 16 downward so that the rod leg 15 and the front foot member 14 can freely go downward by their own weights, then raising the front side of the projector case 1 to adapt the direction of projection by the projection lens 45 to a projection screen, and finally locking the rod leg 15 by releasing the lock releasing lug 16 from being pressed downward.

Next, the light source device 17 will be explained. As shown in FIG. 3 and FIG. 4, the light source device 17 comprises a light source lamp 18, a reflector 21, and a transparent plate 22. The reflector 21 has an opening for emitting light, and reflects light radiated by the light source lamp 18 placed thereinside to emit the light from the opening. The transparent plate 22 is positioned ahead of the opening of the reflector 21.

The light source lamp 18 is a short arc lamp such as a high-pressure mercury vapor lamp or the like. The light source lamp 18 comprises a glass bulb 19 having a sphere-like expanded portion at its center, and a pair of bar electrodes 20a and 20b made of molybdenum and the like. The pair of bar electrodes 20a and 20b are provided such that their front end portions face each other closely in the expanded portion of the glass bulb 19, and their back end portions are exposed from both ends of the glass bulb 19 to the outside of the glass bulb 19. A substance that emits light by an arc is sealed inside the glass bulb 19. When an arc appears between the front end portions of the electrodes 20a and 20b, the glass bulb 19 emits light.

The reflector 21 is an ellipsoidal reflector having its focuses at a point within the reflector and a point ahead of the opening, which points are on the ellipsoidal axis. The reflector 21 is formed of a reflector body made of heat-resistant glass, having a shape of a hollow ellipsoid which is cut perpendicularly to the ellipsoid's major axis, and having an ultraviolet transmissive reflection film 21a provided on all over its internal surface.

The light source lamp 18 is structured such that its one end is positioned within the reflector 21 and its other end protruds to the back of the reflector 21 from an opening which is opened at the center of the innermost portion of the reflector 21. The light source lamp 18 is further structured such that the axis of the glass bulb 19 coincides with the axis of the reflector 21, and a luminous point between the front end portions of the pair of electrodes 20a and 20b coincides with the focus of the reflector 21 that is within the reflector 21.

The transparent plate 22 has an ultraviolet filtering function. According to the present embodiment, an explosion-proof glass which is provided with an ultraviolet reflection film 23 on its one surface, and a low reflexive film 24 on the other surface thereof is used as the transparent plate 22. The transparent plate 22 will hereinafter be referred to as explosion-proof glass.

The light source device 17 further comprises a cylindrical explosion-proof cover 25 which is formed by a cylinder of metal or heat-resistant resin which is positioned at the front of the opening of the reflector 21.

The explosion-proof cover 25 is formed as a cylinder having its both ends opened free, tapered with its diameter increasing from one end toward the other end, and having its entire inner circumferential surface treated for irreflexivity. The free edge of one end, i.e., the larger-diameter-side end, of the explosion-proof cover 25 is formed perpendicular to the axis of the explosion-proof cover 25, while the free edge of the other end, i.e., the smaller-diameter-side end, of the explosion-proof cover 25 is formed inclined in a certain direction by a predetermined angle with respect to a plane perpendicular to the axis of the explosion-proof cover 25.

The explosion-proof cover 25 has the circumference of its one end (larger-diameter-side end) connected to the circumference of the opening of the reflector 21 by means of screws or the like. The explosion-proof glass 22 is fit within the inner circumference of the other end (smaller-diameter-side end) of the explosion-proof cover 25 in such a fashion to be inclined in a certain direction by a predetermined angle with respect to a plane perpendicular to the optical axis of light emitted from the reflector 21, i.e., perpendicular to the axis of the reflector 21.

According to the present embodiment, the explosion-proof glass 22 is arranged as follows. That is, the angle of inclination of the explosion-proof glass 22 with respect to the surface perpendicular to the optical axis $O_1$ of light emitted from the reflector 21 (the axis $O_1$ of the reflector 21) is adjusted such that light emitted from the opening of the reflector 21 and reflected on the explosion-proof glass 22 to thereby return into the reflector 21 does not converge on the light source lamp 18.

Ventilation holes 26 and 27 for air-cooling the inner space of the reflector 21 and the light source lamp 18 are provided to the explosion-proof cover 25 at one side and the other side of the circumferential surface of the end of the cover 25, which end is connected to the reflector 21.

The display element 28 (see FIG. 3) does not comprise means for coloring incoming light such as a color filter. According to the present embodiment, a micromirror display element (or digital micromirror device) generally abbreviated as DMD is used as the display element 28. The display element 28 will hereinafter be referred to as micromirror display element.

Though not illustrated, the micromirror display element 28 is structured such that each of its pixels is formed by a micromirror. The micromirrors are driven to be inclined in one inclination direction and in another inclination direction by a mirror drive element which is formed based on a CMOS (Complementary Metal Oxide Semiconductor). The micromirrors are made of a very thin metal piece (for example, aluminum piece) having height and width of 10 to 20 μm.

The micromirror display element 28 displays an image by reflecting light, coming thereto at an incident angle within a predetermined range of angles with respect to an incident direction which is inclined in a certain direction with respect to the exact forward direction of the micromirror display element 28, in the exact forward direction and an oblique direction by switching the inclination direction of the plurality of micromirrors. The micromirror display element 28 reflects light entering the micromirrors being driven inclinedly in one inclination direction to the exact forward direction by the micromirrors, and reflects light entering the micromirrors being driven inclinedly in another inclination direction to the oblique direction by the micromirrors, thereby to display an image by bright display obtained by the reflection in the exact forward direction and by dark display obtained by the reflection in the oblique direction.

The brightness of the bright display can be arbitrarily changed by adjusting time during which the micromirrors are inclined in the one inclination direction (inclination direction for reflecting the incoming light in the exact forward direction). Therefore, the micromirror display element 28 can display an image whose brightness is varied in gradation.

The micromirror display element 28 is arranged at one edge portion of a rear region in the projector case 1, with its front facing the projection port 11 provided at the one edge portion of the front surface of the projector case 1.

The light source side optical system 29 causes light emitted from the light source device 17 to enter the micromirror display element 28. As shown in FIG. 3 and FIG. 4, the light source side optical system 29 comprises a color wheel 30, a light guiding rod 33, two light source side lenses 34 and 35 arranged in back and forth, and a mirror 37.

The color wheel 30 colors the light emitted from the light source device 17 in three colors of red, green, and blue sequentially. The light guiding rod 33 makes the distribution of intensity of the light emitted from the light source device 17 uniform. The light source side lenses 34 and 35 and the mirror 37 project the light, which is colored by the color wheel 30 and has its distribution of intensity made uniform by the light guiding rod 33, toward the front surface of the micromirror display element 28.

The color wheel 30 is formed of a rotation plate on which sector-shaped color filters 31R, 31G, and 31B colored in three colors of red, green, and blue are arranged side by side in a circumferential direction. The color wheel 30 has the center of the rotation plate fixed on a rotation shaft of a color wheel rotation motor 32 which is arranged at a side of the light path of the light emitted from the light source device 17, so that a portion of the rotating wheel in circumferential direction is present in the light path of the light emitted from the light source device 17.

The color wheel 30 is rapidly rotation-driven by the motor 32, such that the color filters 31R, 31G, and 31B in three colors sequentially pass across the light path of the light emitted from the light source device 17.

The light guiding rod 33 has a cross sectional shape that is geometrically similar to the outer shape of the display area where the plurality of pixels of the micromirror display element 28 are arranged in a matrix. The light guiding rod 33 is formed of an angled cylindrical object whose inner circumferential surface is provided with a reflection film (unillustrated) all over the surface. A light entering area from which light enters is formed at one end of the cylindrical object, and a light emitting area from which the light that enters from the light entering area is emitted is formed at the other end thereof.

The light guiding rod 33 guides light entering from the light entering area by reflecting the light on the reflection film provided on the rod inner circumferential surface, to emit light having a uniform distribution of intensity from the light emitting area. The light guiding rod 33 has its light entering area facing the light source device 17 via the color wheel 30, and is arranged in a manner described below in order to cause light, which is emitted from the opening of the reflector 21 of the light source device 17 and passes, while being refracted, through the explosion-proof glass 22 (arranged obliquely inclinedly ahead of the reflector), to enter the light entering area thereof.

That is, the light guiding rod 33 is arranged at the light emitting side of the color wheel 30 such that the rod center axis coincides with the optical axis of light that has passed through the explosion-proof glass 22, i.e., with an optical axis $O_2$ which is parallelly shifted in one direction (direction of light refraction in the explosion-proof glass 22) from the optical axis (axis of the reflector 21) $O_1$ of the light emitted from the opening of the reflector 21.

The light source side lenses 34 and 35 are arranged inside a lens support cylinder 36 which is arranged at the light emitting side of the light guiding rod 33. The light source side lenses 34 and 35 are arranged such that their centers coincide with an extended line of the center axis of the light guiding rod 33, i.e., with the optical axis $O_2$ of the light emitted from the light source device 17 (light emitted after passing through the explosion-proof glass 22).

According to the present embodiment, a cylindrical light guiding rod support is formed at the light entering side of the lens support cylinder 36. The light guiding rod support is formed such that its one side, that corresponds to where the color wheel rotation motor 32 is arranged, is cut away. The light guiding rod support accommodates the light guiding rod 33 so as to be fit therein.

The light guiding rod 33 may be formed by a transparent angled rod having a cross sectional shape that is geometrically similar to the display area of the micromirror display element 28, and may guide light that enters from the light entering area at its one end while reflecting the light fully on the interface between its outer circumferential surface and the ambient airspace thereby to emit light having a uniform distribution of intensity from the light emitting area at its other end. In this case, the inner diameter of the light guiding rod support of the lens support cylinder 36 may be increased, and the light guiding rod formed of the angled rod may be arranged in the light guiding rod support while allowing a space between the rod and the inner circumferential surface of the rod support.

The reflector 21 of the light source device 17, the color wheel rotation motor 32 of the light source side optical system 29, and the lens support cylinder 36 supporting the light guiding rod 33 and the light source side lenses 34 and 35 are fixed in a predetermined positional relationship inside a light source side housing 38 whose both ends are opened free.

As shown in FIG. 3 and FIG. 4, the light source side housing 38 is set in the rear-half region of the projector case 1, in the frontward/backward direction of the case 1. Further, the light source side housing 38 is arranged such that the side that the light source device 17 is arranged is directed to the side opposed to the side that the micromirror display element 28 is arranged. The light source side housing 38 is further arranged such that the light emitting end of the lens support cylinder 36 faces the region in the exact forward direction of the micromirror display element 28. Furthermore, the light source side housing 38 is arranged such that the optical axis $O_2$ of the light emitted from the light source device 17 is generally perpendicular to the exact forward direction of the micromirror display element 28.

The mirror 37 of the light source side optical system 29 is formed by a plane mirror. The mirror 37 is set inside a mirror housing 39. The mirror housing 39 has openings 40, 41, and 42 in its one side surface, its back surface, and its front surface. The mirror housing 39 is set in the projector case 1 such that the light emitting end of the lens support cylinder 36 is inserted in the opening 40 in the one side surface, and the opening 41 in the back surface faces the micromirror display element 28.

The mirror 37 is arranged so as to face the light emitting end of the lens support cylinder 36 via the region in the exact forward direction of the micromirror display element 28, and so as to be inclined with respect to the optical axis $O_2$ of the light emitted from the light source device 17 by a predetermined angle. The mirror 37 is arranged so as to reflect the light emitted from the light source device 17 and passing through the color wheel 30, the light guiding rod 33, and the light source side lenses 34 and 35, toward the micromirror display element 28. Further, the mirror 37 is arranged such that the light coming thereto from the light source side lenses 34 and 35 is projected toward the micromirror display element 28 from a direction inclined in one direction with respect to the exact forward direction of the micromirror display element 28.

A cover glass 43 for protecting the micromirror display element 28 is arranged in front of the micromirror display element 28. A relay lens 44 is arranged in front of the cover glass 43. The relay lens 44 is provided at the opening in the back surface of the mirror housing 39. The relay lens 44 corrects light emitted from the light source device 17 and projected by the light source side optical system 29 toward the micromirror display element 28 from the direction inclined in one direction with respect to the exact forward direction of the micromirror display element 28 to light parallel with a direction inclined by a predetermined angle with respect to the exact forward direction of the micromirror display element 28, and causes the parallelly-corrected light to enter the micromirror display element 28. The relay lens 44 causes the image light emitted from the micromirror display element 28 to converge and enter the projection lens 45.

The relay lens 44 has a characteristic for emitting light that is surface-reflected by the relay lens surface, of the light projected from the light source side optical system 29, in directions other than the direction of projection by the projection lens 45.

The relay lens 44 is formed of a meniscus lens whose one surface is formed convex and whose other surface is formed concave. The relay lens 44 is arranged such that its convex surface faces the micromirror display element 28 and its concave surface faces the light source side optical system 29 and the projection lens 45. The relay lens 44 is further arranged such that its lens center faces the neighborhood of the center of an end portion in the peripheral end portion of the display area of the micromirror display element 28. The end portion in the peripheral end portion of the display area of the micromirror display element 28 is located in the opposite side against the side where the light projected from the light source side optical system 29 enters.

The concave surface of the relay lens 44 that faces the light source side optical system 29 and the projection lens 45 is formed as a surface having a curvature at which the light that is surface-reflected by the concave surface, of the light projected from the light source side optical system 29, is emitted in directions other than the direction of projection by the projection lens 45.

The convex surface of the relay lens 44 that faces the micromirror display element 28 is formed as described below based on the curvature of the concave surface. That is, the convex surface of the relay lens 44 is formed at a curvature at which the light projected from the light source side optical system 29 is refracted to the direction inclined by a predetermined angle with respect to the exact forward direction of the micromirror display element 28 by the concave and convex surfaces to enter the micromirror display element 28, and the light emitted from the micromirror display element 28 in its exact forward direction is refracted by the convex and concave surfaces to converge and enter the projection lens 45.

The effective region of the relay lens 44 is a portion of a circular lens, that corresponds to the display area of the micromirror display element 28, and portions other than this portion are ineffective regions. Therefore, according to the present embodiment, the relay lens 44 having a shape obtained by cutting the ineffective regions from a circular lens is used.

The projection lens 45 comprises a light entering side fixed mirror tube 46 and a light emitting side movable mirror tube 47 which is engaged with the fixed tube 46 and movable forward and backward in the axial direction by a rotation operation. The projection lens 45 is a varifocal lens provided with lens groups 48 and 49 including a plurality of lens elements respectively in the mirror tubes 46 and 47.

The projection lens 45 is arranged in the projector case 1 as described below. The rear anchor of the fixed mirror tube 46 is inserted in the opening 42 in the front surface of the mirror housing 39. The fixed mirror tube 46 is arranged such that its light emitting end faces the micromirror display element 28 via the relay lens 44. The movable mirror tube 47 is arranged such that its light emitting end is movably fit into the projection port 11 provided at the one edge portion of the front surface of the projector case 1.

An opening 50 is provided in one side surface of the projector case 1 that is closer to where the projection lens 45 is arranged. The opening 50 allows the movable tube 47 of the projection lens 45 to be manually rotated to be moved in the axial direction so that the projection lens 45 can be focally adjusted.

A display/audio system circuit board 51 is arranged in the projector case 1. The display/audio system circuit board 51 is provided to be erect between the back surface of the projector case 1 and the light source side housing 38.

The display/audio system circuit board 51 is connected to the unillustrated USB terminal, input terminal for color image signals and audio signals, and video signal input terminal which are provided on the back surface of the projector case 1. The micromirror display element 28 and a speaker (unillustrated) provided on the internal top surface of the projector case 1 so as to face the sound releasing section 9 for speaker are connected to the circuit board 51.

A power source system circuit board 52 is horizontally placed in the space ahead of the light source side housing 38 inside the projector case 1. The power source system circuit board 52 is connected to the unillustrated power source connector which is provided on the back surface of the projector case 1. The light source lamp 18 of the light source device 17 is connected to the circuit board 52. The light source lamp 18 is connected to the circuit board 52 via lead wires 53a and 53b which are connected to the exposed portions of the pair of electrodes 20a and 20b respectively. The color wheel rotation motor 32 is further connected to the circuit board 52 via an unillustrated lead wire.

The lead wire 53a that is connected to the exposed portion of the electrode 20a within the reflector 21, of the pair of electrodes 20a and 20b of the light source lamp 18, is led out from the reflector 21 through a lead insertion hole bored in the reflector 21. Further, the lead wire 53a is led out from the end of the light source side housing 38 and connected to the power source system circuit board 52.

Further, a projector control circuit board 54 is horizontally provided inside the projector case 1. The projector control circuit board 54 is arranged between the internal top surface of the projector case 1 and the light source side housing 38 and mirror housing 39. The display/audio system circuit board 51, the power source system circuit board 52, and the lamp indicator 3, overheat indicator 4, automatic image quality adjusting key 5, manual image quality adjusting key 6, and power/standby indicator 7 which are provided on the top surface of the projector case 1 are connected to the control circuit board 54.

Further, unillustrated various adjusting keys, reception element, and light source temperature detecting sensor are connected to the control circuit board 54. The various adjusting keys are operated by opening an open/close lid 8. The reception element is provided inside the projector case 1 so as to face the communication unit 10 which is provided at the front surface of the projector case 1. The light source temperature detecting sensor is arranged at a position close to the reflector 21 within the light source side housing 38.

A plurality of long-hole-like intake vents 55, 56, and 57 for air-cooling the interior of the projector case 1 are provided in the bottom surface of the projector case 1, one side surface of the projector case 1 closer to the projection lens 45, and the back surface of the projector case 1.

The light source side housing 38 and the power source system circuit board 52 are arranged so as to secure a ventilation space between themselves and the bottom surface of the projector case 1. The plurality of intake vents 55 in the case bottom surface are provided underneath the light source side housing 38 and the power source system circuit board 52.

The projection lens 45 is arranged so as to secure a ventilation space between itself and the side surface of the projector case 1. The plurality of intake vents 56 in the case side surface are provided in generally the entire region that is behind the opening 50 for projection lens focal adjustment provided in the case side surface.

The display/audio system circuit board 51 is arranged so as to secure a ventilation space between itself and the top surface of the projector case 1. The plurality of intake vents 57 in the case back surface are provided in a region corresponding to where the micromirror display element 28 is arranged.

The intake vents (unillustrated) that are provided underneath the power source system circuit board 52, among the plurality of intake vents 55 in the case bottom surface, and the intake vents 56 in the case side surface are natural intake vents. The intake vents 55 provided in the case bottom surface underneath the light source side housing 38 and the intake vents 57 provided in the case back surface correspondingly to where the micromirror display element 28 is arranged are forcible intake vents. Intake fans 58 and 59 are arranged inside the projector case 1 so as to face the forcible intake vents 55 and 57 respectively.

A plurality of long-hole-like exhaust vents 61 are provided in the side surface of the projector case 1 that is closer to where the light source device 17 is arranged, in generally the entire region of the side surface.

The side surface of the projector case 1 that is closer to where the light source device 17 is arranged is formed by a built-in panel 60. The plurality of exhaust vents 61 are provided in generally the entire region of the built-in panel 60.

All of the exhaust vents 61 are forcible exhaust vents. A plurality of, for example, three high-wind-power exhaust fans 62, 63, and 64 are provided inside the projector case 1 correspondingly to the regions where the exhaust vents 61 are formed, i.e., correspondingly to generally the entire region of the built-in panel 60.

The intake fans 58 and 59 and the exhaust fans 62, 63, and 64 are connected to the power source system circuit board 52.

The rim of each of the plurality of exhaust vents 61 is formed in a shape having no surface and having an angle perpendicular or generally perpendicular to the direction of exhaust stream from the exhaust fans 62, 63, and 64, i.e., in a shape that hardly causes vortex in the exhaust stream. Because of this, the exhaust efficiency in performing exhausting by using the exhaust fans 62, 63, and 64 can be improved and the wind roar of the forcible exhaust stream from the exhaust fans 62, 63, and 64 can be reduced.

According to the present embodiment, the cross sectional shape of the portions between adjacent exhaust vents is generally rhombic. Due to this, the rim of each of the plurality of exhaust vents 61 is formed such that its width of the rim (thickness of the built-in panel 60) inclinedly increases from the width center toward the inner and outer surfaces of the projector case.

The present projector causes the light source device 17 to emit light and rotation-drives the color wheel 30 of the light source side optical system 29 rapidly. Due to this, the projector causes the light that is emitted from the light source device 17 and enters the light source side optical system 29 to be colored in red, green, and blue sequentially by the color wheel 30. Further, the projector causes the distribution of intensity of the colored light to be uniform by the light guiding rod 33 and then projected toward the micromirror display element 28 by the light source side lenses 34 and 35 and the mirror 37. The projector then causes single-color data of red, green, and blue to be sequentially written on the micromirror display element 28 in synchronization with the cycle at which each of red, green, and blue lights is projected toward the micromirror display element 28, and causes the micromirror display element 28 to sequentially display single-color images of each of red, green, and blue. The projector causes the projection lens 45 to project the single-color image lights of each of red, green, and blue in enlargement on the projection screen, so that the three single-color images of each of red, green, and blue are overlaid and displayed as a full color image on the projection screen.

The projector is used by opening the projection lens cover 12 as shown in FIG. 2 to expose the light emitting end of the projection lens 45 and switching on the power source key 2. When the power source key 2 is switched on, the light source lamp 18 of the light source device 17 is turned on and the color wheel 30 is rotation-driven so that red, green, and blue lights are sequentially projected to the micromirror display element 28. Then, the red, green, and blue lights sequentially emitted from the micromirror display element 28 are projected by the projection lens 45. Further, the intake fans 58 and 59 and the exhaust fans 62, 63, and 64 are driven to start air-cooling inside the projector case 1.

The position adjustment of the projector case 1 for adapting the direction of projection by the projection lens 45 to the projection screen is made by adjusting the height of protrusion of the front foot member 14 while letting the projection lens 45 project the red, green, and blue lights.

When no image signal or video signal is input from a personal computer, red, green, and blue lights are sequentially emitted from the entire display area of the micromirror display element 28 and the emitted lights are projected by the projection lens 45. Accordingly, the projection area of the projection screen are white all over the surface.

When an image signal or a video signal is input, single-color image data of each of red, green, and blue are sequentially written on the micromirror display element 28, and three single-color images of red, green, and blue are sequentially projected so that a full color image is displayed on the projection screen.

When image projection is finished, the input of the image signal or video signal is stopped, the power source key 2 is switched off, and the projection lens cover 12 is closed as shown in FIG. 1. When the power source key 2 is switched off, the light source lamp 18 of the light source device 17 is turned off and the rotation-driving of the color wheel 30 is stopped. When a predetermined time elapses after the power source key 2 is switched off, or when the light source temperature drops to a predetermined temperature or lower, the driving of the intake fans 58 and 59 and exhaust fans 62, 63, and 64 is stopped.

When finishing image projection by stopping the input of an image signal or video signal, the user may sometimes close the projection lens cover 12 without switching off the power source key 2, because the entire projection region of the projection screen becomes white as described above. In such a case, the light source lamp 18 is continuously turned on and the color wheel 30, the intake fans 58 and 59, and the exhaust fans 62, 63, and 63 are also continuously driven, thereby electricity is consumed wastefully.

However, the present projector has an opening at the center of the projection lens cover 12, and the opening is provided with the semitransparent plate 13. Therefore, when the projection lens cover 12 is closed without the power source key 2 turned off, the semitransparent plate 13 glows by receiving light emitted from the projection lens 45. Therefore, the user can become aware that he/she has forgotten to switch off the power source.

In the present projector, the light source device 17 causes the light emitted from the luminous point of the light source lamp 18 to be reflected on the reflector 21 so that the light is converged and emitted from the opening of the reflector 21, and causes the light to be emitted from the explosion-proof glass 22 arranged ahead of the opening of the reflector 21 while passing through the explosion-proof glass 22.

The light source device 17 is formed by arranging the explosion-proof glass 22 ahead of the opening of the reflector 21. The explosion-proof glass 22 is arranged so as to be obliquely inclined by a predetermined angle with respect to a plane perpendicular to the optical axis $O_1$ of the light emitted from the reflector 21. Due to this, of the light radiated from the light source lamp 18 and then reflected on the reflector 21 to be emitted from the opening of the reflector 21, the light that is reflected on the explosion-proof glass 22 can be controlled not to converge on the light source lamp 18. Accordingly, temperature rise of the light source lamp 18 by the light reflected on the explosion-proof glass 22 to return into the reflector 21 can be prevented, and overheating of the light source lamp 18 can be restricted.

Figure 5:
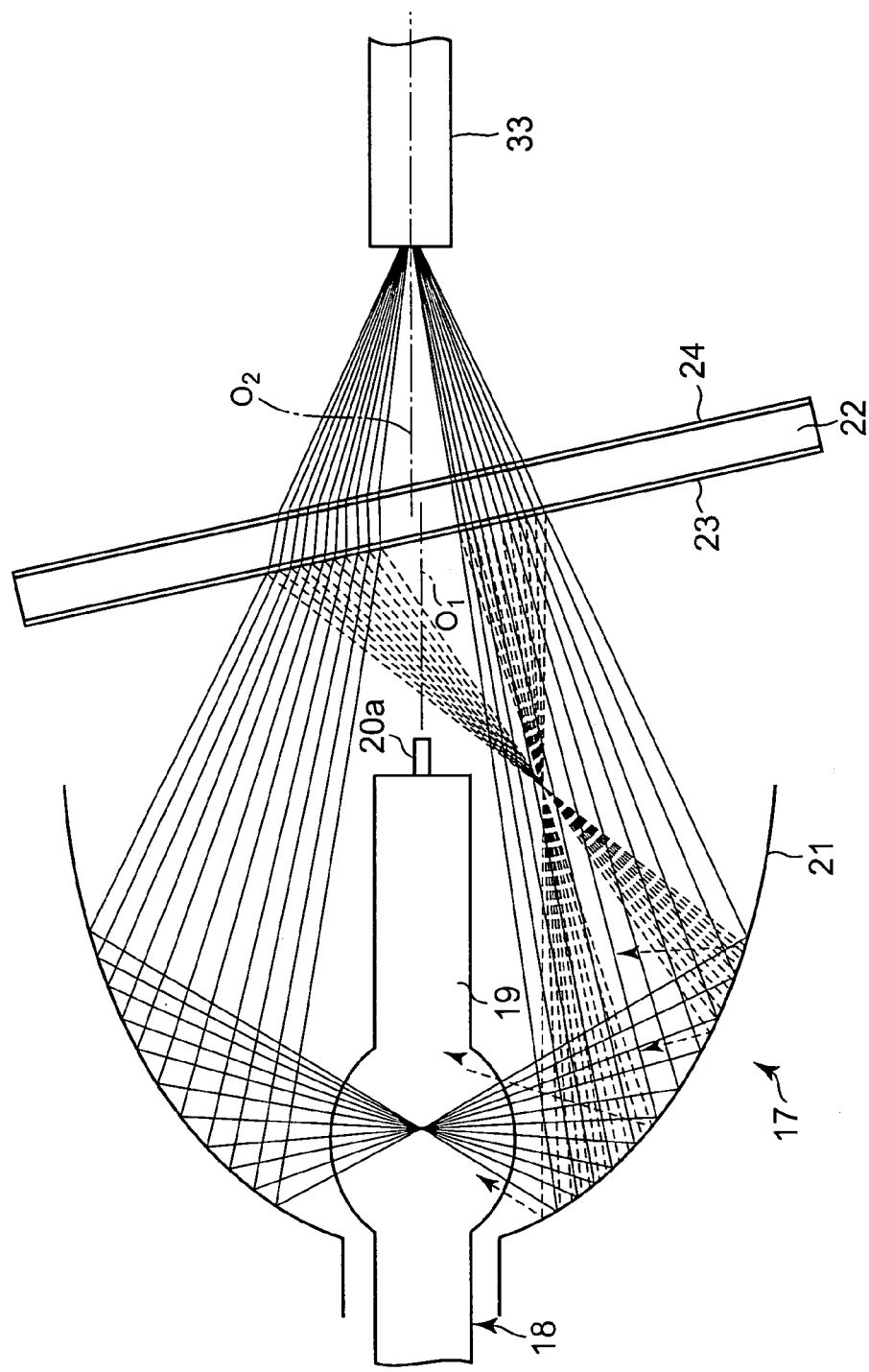
FIG. 5 is a diagram showing the directions of light in a light source device of the projector, where the light is emitted from a reflector of the light source device and reflected on a light entering area of an explosion-proof glass.
Figure 6:
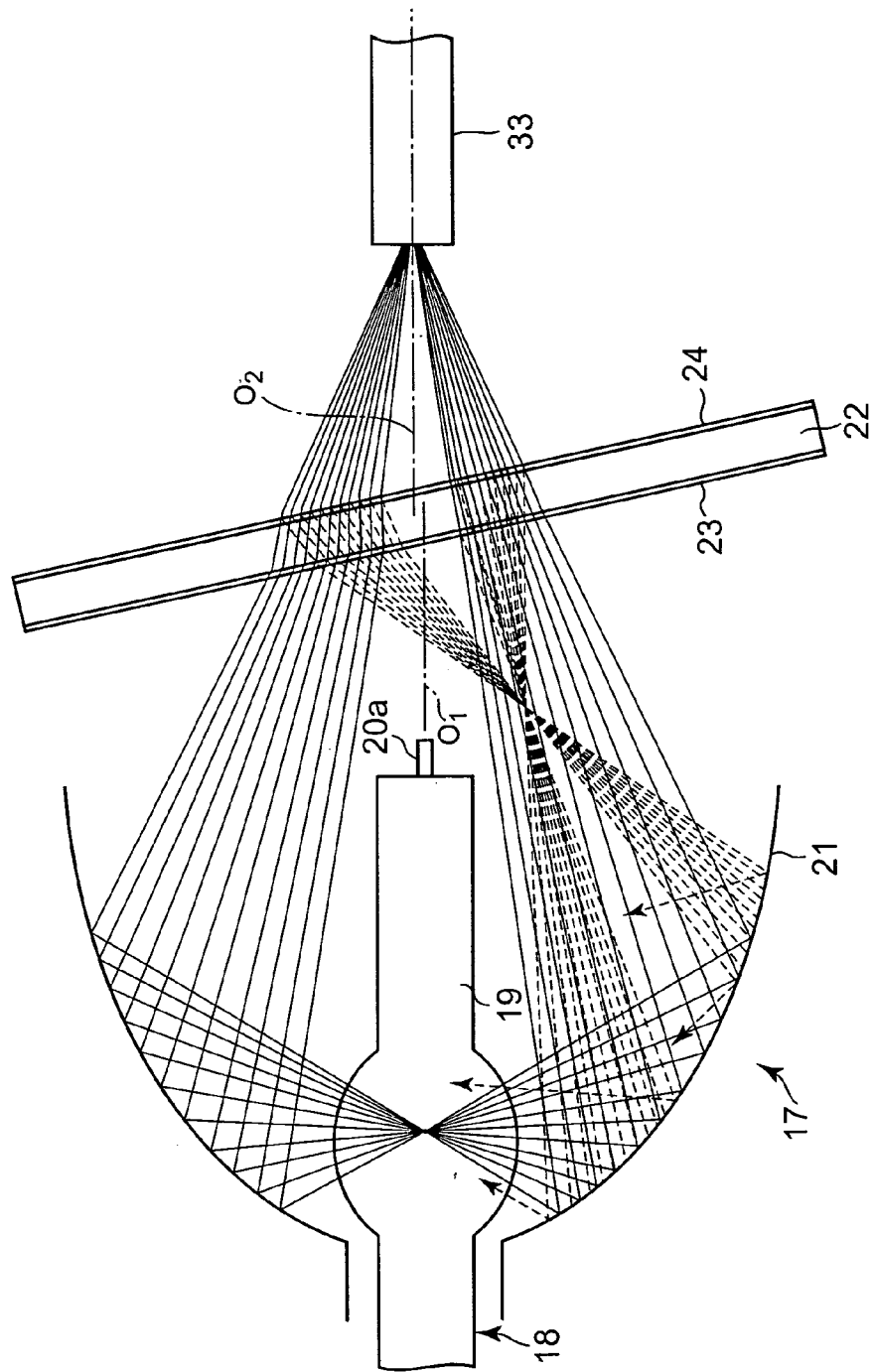
FIG. 6 is a diagram showing the directions of light in the light source device of the projector, where the light is emitted from the reflector of the light source device and reflected on a light emitting area of the explosion-proof glass.
Figure 7:
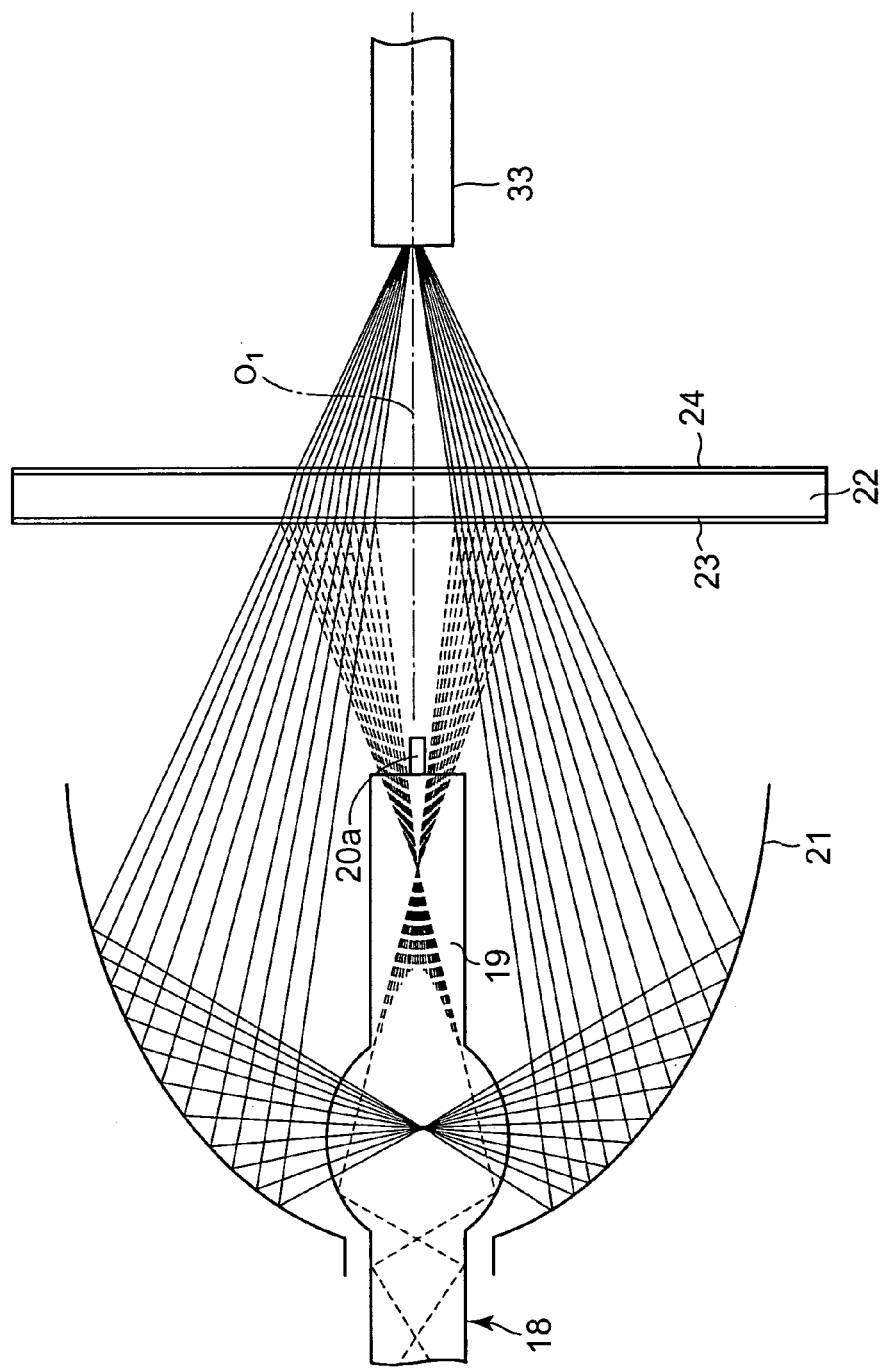
FIG. 7 is a diagram showing the directions of light in a prior-art light source device in which an explosion-proof glass is arranged vertically, where the light is emitted from a reflector of the light source device and reflected on a light entering area of the explosion-proof glass.
Figure 8:
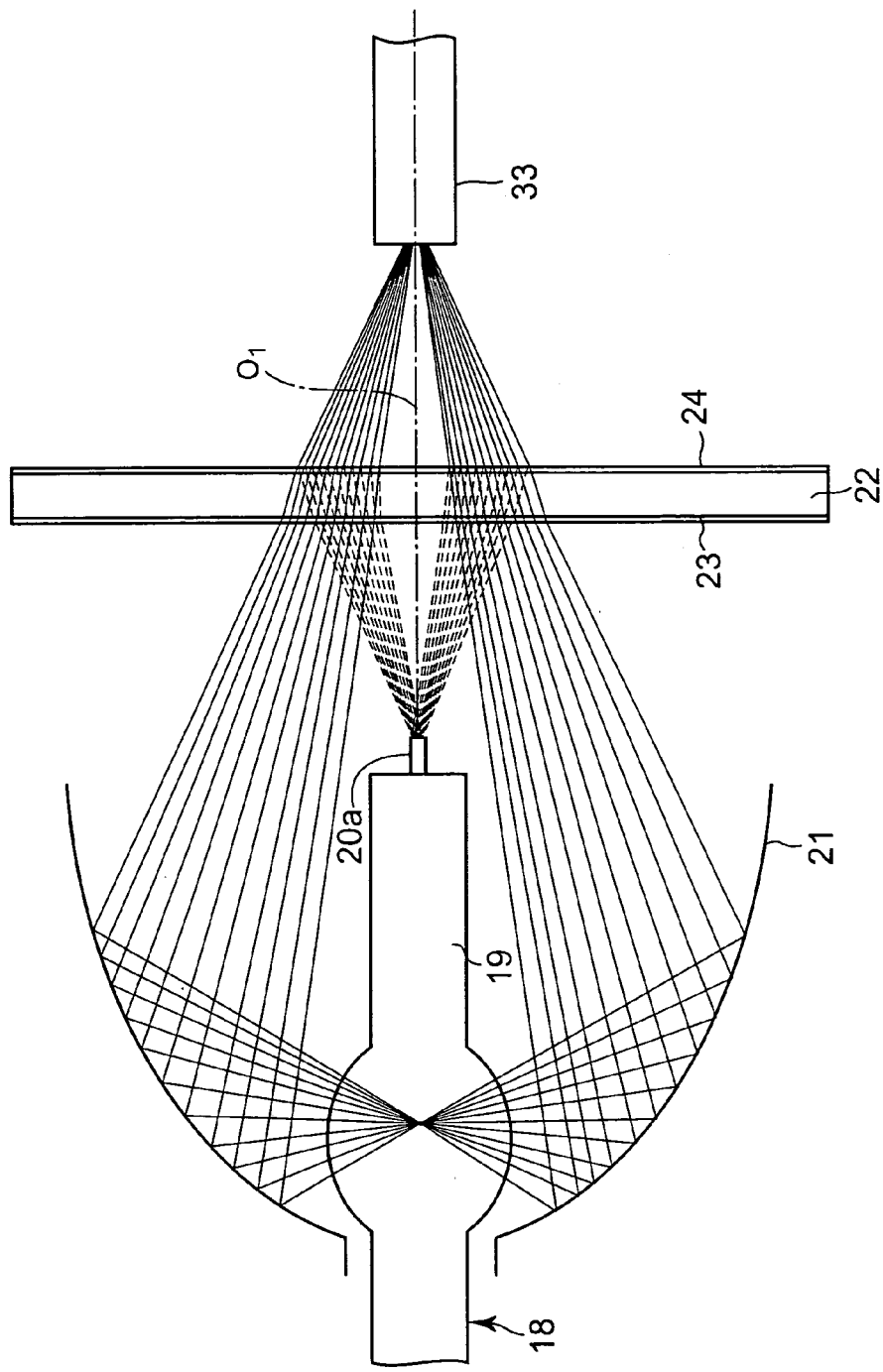
FIG. 8 is a diagram showing the directions of light in the prior-art light source device in which the explosion-proof glass is arranged vertically, where the light is emitted from the reflector of the light source device and reflected on a light emitting area of the explosion-proof glass.

FIG. 5 and FIG. 6 show the directions of light emitted from the reflector 21 of the light source device 17 and reflected on the explosion-proof glass 22. FIG. 7 and FIG. 8 show the directions of light emitted from the reflector 21 and reflected on the explosion-proof glass 22 in a case where the explosion-proof glass 22 is arranged perpendicularly to the optical axis $O_1$ of the light emitted from the reflector 21, i.e., the directions of light reflected on the explosion-proof glass 22 of a conventional light source device.

FIG. 5 and FIG. 7 show the directions of light reflected on the light entering area of the explosion-proof glass 22. FIG. 6 and FIG. 8 show directions of light reflected on the light emitting area of the explosion-proof glass 22.

According to the light source device 17 in which the explosion-proof glass 22 is arranged to be inclined with respect to a plane perpendicular to the optical axis $O_1$ of the light emitted from the reflector 21, the optical axis $O_2$ of the light emitted after passing through the explosion-proof glass 22 is shifted in one direction (direction of light refraction in the explosion-proof glass 22) parallelly with the optical axis $O_1$ (axis of the reflector 21) of the light emitted from the opening of the reflector 21, as shown in FIG. 5 and FIG. 6. On the other hand, according to the conventional light source device in which the explosion-proof glass 22 is arranged perpendicularly to the optical axis $O_1$ of the light emitted from the reflector 21, the optical axis of the light emitted after passing through the explosion-proof glass 22 is the same as the optical axis $O_1$ of the light emitted from the opening of the reflector 21, as shown in FIG. 7 and FIG. 8.

The light source device 17 causes light radiated from the luminous point of the light source lamp 18 to be reflected on the reflector 21 as indicated by solid lines in FIG. 5 and FIG. 6, and causes the reflected light to pass through the explosion-proof glass 22 arranged ahead of the opening of the reflector 21 to be emitted therefrom. And the light emitted from the explosion-proof glass 22 after passing therethrough is partially reflected on the light entering area of the explosion-proof glass 22 (the external surface of the ultraviolet reflection film 23 provided on one surface of the explosion-proof glass 22 that is closer to the reflector 21, or the interface between the ultraviolet reflection film 23 and the explosion-proof glass 22) thereby to return into the reflector 21 as indicated by the broken lines in FIG. 5. And the light that passes through the explosion-proof glass 22 is partially reflected on the light emitting area of the explosion-proof glass 22 (the external surface of the low reflexive film 24 provided on the light emitting area of the explosion-proof glass 22, or the interface between the low reflexive film 24 and the explosion-proof glass 22) thereby to return into the reflector 21 as indicated by the broken lines in FIG. 6.

The light source lamp 18 is provided in the light source device 17 in a manner described below. The light source lamp 18 is provided with the pair of bar electrodes 20a and 20b in the glass bulb 19. The pair of bar electrodes 20a and 20b are provided such that their front end portions closely face each other and their back end portions are exposed from the glass bulb 19. The light source lamp 18 is an arc lamp such as a high-pressure mercury vapor lamp or the like which has a substance that emits light by an arc sealed in the glass bulb 19. The glass bulb 19 emits light by an arc that is caused between the front end portions of the electrodes 20a and 20b.

The reflector 21 is an ellipsoidal reflector having its focuses at a point within the reflector and a point ahead of the opening, which points are on the axis of ellipsoid. The light source lamp 18 is arranged such that its one end is positioned within the reflector 21 while the other end thereof is protruded to the back of the reflector 21, and the luminous point between the front end portions of the pair of electrodes 20a and 20b coincides with one focus of the reflector 21 that is within the reflector 21. Because of this, light that is reflected on the light entering area of the explosion-proof glass 22 converges on a point within the reflector 21, and light that is reflected on the light emitting area of the explosion-proof glass 22 converges on another point within the reflector 21.

This is true of the light source device in which the explosion-proof glass 22 is arranged perpendicularly to the optical axis $O_1$ of the light emitted from the reflector 21.

However, in the conventional light source device, the explosion-proof glass 22 is arranged perpendicularly to the optical axis $O_1$ of the light emitted from the reflector 21 and the light reflected on the explosion-proof glass 22 to return into the reflector 21 converges on the light source lamp 18 as indicated by broken lines in FIG. 7 and FIG. 8. Therefore, in addition to the heat generated by the light emission of the light source lamp 18, the convergence of the light that returns by being reflected on the explosion-proof glass 22 also raises the temperature of the light source lamp 18, driving the light source lamp 18 to an overheat state.

The light source lamp 18 is an arc lamp such as a high-pressure mercury vapor lamp or the like. In the light source lamp 18, the pair of bar electrodes 20a and 20b are provided such that their front end portions closely face each other in the glass bulb 19, and their back end portions are exposed to the outside of the glass bulb 19. Since the returning light converges on the electrode 20a within the reflector 21 of the light source lamp 18, the rise of the temperature of the light source lamp 18 caused by the convergence of the returning light is considerably large. Further, as shown in FIG. 8, in a case where the returning light converges on the exposed portion of the electrode 20a within the reflector 21 of the light source lamp 18, the exposed portion of the electrode 20a might be melted or thermally oxidized due to a reaction with the air in the reflector 21.

As compared with this, in the light source device 17 of the present embodiment, the explosion-proof glass 22 is arranged so as to be inclined with respect to a plane perpendicular to the optical axis $O_1$ of the light emitted from the reflector 21, at an inclination angle at which the light reflected on the explosion-proof glass 22 to return into the reflector 21 does not converge on the light source lamp 18. Accordingly, the light that is reflected on the explosion-proof glass 22 and returns into the reflector 21 does not converge on the light source lamp 18.

Further, in the light source device 17, the reflector 21 is formed by an ellipsoidal reflector, and the luminous point between the front end portions of the pair of electrodes 20a and 20b coincides with one focus of the reflector 21 that is within the reflector 21. Due to this, the returning light that has been reflected on the light entering area of the explosion-proof glass 22 and the returning light that has been reflected on the light emitting area of the explosion-proof glass 22 respectively converge on regions where the light source lamp 18 is not located within the reflector 21. Therefore, the light reflected on the explosion-proof glass 22 can more securely be prevented from converging on the light source lamp 18.

The returning light that has been reflected on the light emitting area of the explosion-proof glass 22 passes through the point of convergence and is again reflected on the reflector 21. However, since this reflected light is dispersed as shown in FIG. 5 and FIG. 6, this re-reflected light does not converge on the light source lamp 18, and does not therefore raise the temperature of the light source lamp 18.

Therefore, according to the light source device 17, overheating of the light source lamp 18 that might be caused by the returning light that has been reflected on the explosion-proof glass 22 can be prevented in the entire lamp body, the exposed portion of the electrode 20a within the reflector 21 of the light source lamp 18 can be protected from melting or thermal oxidization, and temperature rise in the entire light source lamp 18 can be reduced.

The explosion-proof glass 22 needs only to be arranged at an inclination angle at which the light that is reflected on the explosion-proof glass 22 and returns into the reflector 21 does not converge on at least the exposed portion of the electrode 20a within the reflector 21 of the light source lamp 18. With this arrangement, it is possible to prevent overheating of the exposed portion of the electrode 20a within the reflector 21 of the light source lamp 18 due to the light returning into the reflector 21, and to protect the exposed portion of the electrode 20a from melting or thermal oxidization.

Further, in the light source device 17, the explosion-proof glass 22 is arranged ahead of the opening of the reflector 21.

Because of this, in case that the light source lamp 18 should explode, the components such as the color wheel 30, etc. that are arranged at the light emitting side of the light source device 17 can be protected from being damaged.

Moreover, the light source device 17 is provided with the cylindrical explosion-proof cover 25 having its both ends opened free, at the front of the opening of the reflector 21. The circumference of one end of the explosion-proof cover 25 is connected to the circumference of the opening of the reflector 21, and the explosion-proof glass 22 is fit within the inner circumference of the other end of the explosion-proof cover 25. Because of this, in case that the light source lamp 18 should explode, the components such as the light source side housing 38, etc. that are arranged around the light emitting side of the light source device 17 can be protected from being damaged.

In the light source device 17, the reflector 21 is provided with the ultraviolet transmissive reflection film 21a on all over its internal surface. This can cause ultraviolet components included in the light emitted from the light source lamp 18 to pass through the reflector 21 to be emitted outside. Because of this, light including less ultraviolet than the light emitted from the light source lamp 18 can be emitted from the opening of the reflector 21.

In the light source device 17, the ultraviolet reflection film 23 provided on one surface of the explosion-proof glass 22 imparts an ultraviolet filtering function to the explosion-proof glass 22. Therefore, ultraviolet components included in the light emitted from the opening of the reflector 21 are reflected on the ultraviolet reflection film 23 of the explosion-proof glass 22 so that light including further less ultraviolet can be emitted. Thus, it is possible to reduce degradation of the color filters 31R, 31G, and 31B of the color wheel 30 of the light source side optical system 29 due to ultraviolet and lower the degree of heat generation by the light from the micromirror comprised of the micromirror display element 28, i.e., it is possible to remove influences of ultraviolet on the components such as the color wheel 30, the micromirror display element 28, etc. to which light emitted from the light source device 17 enters.

Further, in the light source device 17, the low reflexive film 24 is provided on the other surface of the explosion-proof glass 22. This inhibits the explosion-proof glass 22 from reflecting the light emitted from the opening of the reflector 21, so that the light emitted from the reflector 21, with its ultraviolet components removed, can efficiently be emitted from the explosion-proof glass 22 after passing therethrough.

In FIG. 3 and FIG. 4, the explosion-proof glass 22 is arranged such that its surface on which the ultraviolet reflection film 23 is formed is on the side of the reflector 21, and its surface on which the low reflexive film 24 is formed is on its light emitting side. Contrary to the illustrations, the surface on which the low reflexive film 24 is formed may be on the side of the reflector 21 and the surface on which the ultraviolet reflection film 23 is formed may be on the light emitting side.

The light emitted from the light source device 17 enters the light guiding rod 33 after being colored in red, green, and blue sequentially by the color wheel 30 of the light source side optical system 29.

The light emitted from the light source device 17, i.e., the light emitted from the opening of the reflector 21 and passing while being refracted through the explosion-proof glass 22 which is arranged inclinedly, is turned into light whose optical axis $O_2$ is parallelly shifted in one direction from the optical axis $O_1$ of the light emitted from the opening of the reflector 21, as described above.

In the present projector, the light guiding rod 33 is arranged such that its center axis corresponds to the optical axis $O_2$ of the light emitted from the light source device 17 and passing through the explosion-proof glass 22 (the light emitted from the opening of the reflector 21 and passing through the transparent plate arranged ahead of the reflector 21). This makes it possible to cause the light emitted from the light source device 17 to enter the light guiding rod 33 from its light entering area.

The light that enters the light guiding rod 33 from its light entering area is emitted from its light emitting area with the distribution of light intensity made uniform by the light guiding rod 33. Then, the light is projected toward the micromirror display element 28 by the light source side lenses 34 and 35 and the mirror 37 from a direction inclined in one direction with respect to the exact forward direction of the micromirror display element 28. Thereafter, the light enters the micromirror display element 28 after being corrected by the relay lens 44 to a light parallel with a direction inclined by a predetermined angle with respect to the exact forward direction of the micromirror display element 28.

The micromirror display element 28, on which red, green, and blue single-color image data are sequentially written in synchronization with the cycle at which red, green, and blue lights are projected, displays red, green, and blue single-color images sequentially.

The red, green, and blue single-color image lights sequentially emitted from the micromirror display element 28 converge through the relay lens 44 and enter the projection lens 45, so that the images are expanded and projected on the projection screen by the projection lens 45.

In the present projector, a meniscus lens is used as the relay lens 44 (that is, the surface of the relay lens 44 that faces the micromirror display element 28 is formed convex, and the surface thereof that faces the light source side optical system 29 and the projection lens 45 is formed concave). Therefore, the light projected from the light source side optical system 29 can be caused to enter the micromirror display element 28 after being corrected to light parallel with a direction inclined by a predetermined angle with respect to the exact forward direction of the micromirror display element 28, and image light emitted from the micromirror display element 28 can be caused to enter the projection lens 45. Of the light projected from the light source side optical system 29, the light that is surface-reflected on the concave surface of the relay lens 44 facing the light source side optical system 29 and the projection lens 45 can be emitted in directions other than the direction in which the image light is projected by the projection lens 45. Therefore, the light that is surface-reflected on the concave surface of the relay lens 44 facing the light source side optical system 29 and the projection lens 45 is not projected on the projection screen by the projection lens 45. Accordingly, a projection image having a high image quality with no intensity unevenness or contrast degradation can be displayed on the projection screen.

The interior of the projector case 1 is air-cooled in the following manner. The air in the projector case 1 is forcibly exhausted by the high-wind-power exhaust fans 62, 63, and 64 from the plurality of exhaust vents 61 provided in generally the entire one side surface of the projector case 1 that is closer to where the light source device 17 is arranged. And the external air is forcibly sucked into the projector case 1 by the intake fans 58 and 59 from the plurality of intake vents 55 provided in the case bottom surface underneath the light source side housing 38 and from the intake vents 57 provided in the case back surface correspondingly to where the micromirror display element 28 is arranged. The external air is further sucked into the projector case 1 from the unillustrated intake vents provided in the case bottom surface underneath the power source system circuit board 52 and the plurality of intake vents 56 provided in one side surface of the projector case 1 that is closer to where the projection lens 45 is arranged, by natural intake in conjunction with exhaustion of the internal air from the exhaust vents 61. The coolant air sucked from the intake vents 55, 56, and 57 provided in the above-described surfaces is circulated in the projector case 1 as indicated by broken-line arrows in FIG. 3 to air-cool the entire region inside the projector case 1. Part of the coolant air is let into the reflector 21 from the ventilation hole 26 which is provided at one side of the explosion-proof cover 25 of the light source device 17, and the air in the reflector 21 is let out to the interior of the reflector 21 from the ventilation hole 27 which is provided at the other side of the explosion-proof cover 25. Thereby, the inner space of the reflector 21 and the light source lamp 18 are air-cooled.

The present projector comprises the light source device 17, the micromirror display element 28, the light source side optical system 29 for causing the light emitted from the light source device 17 to enter the micromirror display element 28, and the projection lens 45 for projecting the light emitted from the micromirror display element 28 to the projection screen. This projector can elongate the life duration of the light source lamp 18 since the light source device 17 has the above-described effect of suppressing overheating of the light source lamp 18, thereby reducing the frequency of lamp replacement.

The present projector is structured such that the light source side optical system 29 for causing the light emitted from the light source device 17 to enter the micromirror display element 28 includes the light guiding rod 33. The light guiding rod 33 is formed by a cylindrical object or a rod object which has a light entering area for letting in light at its one end and a light emitting area for emitting light entering from the light entering area at its other end. The light guiding rod 33 guides the light entering from the light entering area so as to emit light having a uniform distribution of intensity from the light emitting area.

The light guiding rod 33 is arranged such that its light entering area faces the light source device 17 and its center axis coincides with the optical axis $O_2$ of the light emitted from the opening of the reflector 21 of the light source device 17 and passing through the explosion-proof glass 22 arranged ahead of the reflector 21 (the optical axis which is parallelly shifted in one direction from the optical axis $O_1$ of the light emitted from the opening of the reflector 21). Because of this, the light emitted from the light source device 17 can be let in to the light guiding rod 33 from its light entering area, and light having a sufficient intensity and a uniform distribution of intensity can be emitted from the light emitting area of the light guiding rod 33 and then let into the micromirror display element 28. Accordingly, the micromirror display element 28 can display an excellent image having a sufficient brightness and no intensity unevenness, so that a high-quality image can be projected on the projection screen.

The present projector comprises the color wheel 30 in the light source side optical system 29. The color wheel 30 is formed of a rotation plate on which three color filters 31R, 31G, and 31B of red, green, and blue are arranged side by side in a circumferential direction. The color wheel 30 is rotation-driven such that the three color filters 31R, 31G, and 31B sequentially pass across the light path of the light emitted from the light source device 17. Further, as the display element, the micromirror display element 28 is used which has no means for coloring light coming thereto, and has a plurality of pixels on which red, green, and blue three single-color image data are sequentially written in synchronization with the rotation of the color wheel 30. Therefore, the micromirror display element 28 sequentially displays red, green, and blue three single-color images having a high resolution, so that these single-color images are sequentially projected on the projection screen and a highly-precise color image can be viewed.

In the light source device 17 according to the present embodiment, the explosion-proof glass 22 on whose one surface the ultraviolet reflection film 23 is provided and on whose other surface the low reflexive film 24 is provided is arranged ahead of the opening of the reflector 21. The explosion-proof glass 22 may be such that has either the ultraviolet reflection film 23 or the low reflexive film 24, or may be a stand-alone explosion-proof glass having neither the ultraviolet reflection film 23 nor the low reflexive film 24.

Furthermore, the transparent plate arranged ahead of the opening of the reflector 21 is not limited to an explosion-proof glass but may be an ultraviolet filter. With the ultraviolet filter provided, the transparent plate has an ultraviolet filtering function, making it possible to remove influence of ultraviolet on the components to which the light emitted from the light source device 17 enters.

In the projector according to the present embodiment, the color wheel 30 is arranged at the light entering side of the light guiding rod 33 of the light source side optical system 29. The color wheel 30 may be arranged at other positions as long as such positions are present in the light path from the light source device 17 to the light entering end of the projection lens 45.

The projector according to the present embodiment needs only to be one that displays images by controlling emission of an incoming light, and may therefore be a reflexive liquid crystal display element having a reflexive film on its back surface or a transmissive liquid crystal display element that displays images by controlling emission of light coming from its back surface to its front surface. In case of using the reflexive liquid crystal display element, the projector may be structured such that light which enters the display element from a direction inclined in one direction with respect to the exact forward direction of the display element, passes through the liquid crystal layer, and is then reflected on the reflexive film is emitted in the exact forward direction after being refracted by a prism sheet or the like. On the other hand, in case of using the transmissive liquid crystal display element, the arrangement of the light source device 17 and the configuration of the light source side optical system 29 may be changed such that light is projected to the transmissive liquid crystal display element from its back surface.

Further, in a case where a liquid crystal display element is used as a display element, such a liquid crystal display element may be a color display element having color filters in plural colors, for example, three colors of red, green, and blue corresponding to each of a plurality of pixels. In a case where such a color display element is used, the color wheel 30 may be omitted from the light source side optical system 29 and white light may be projected to the color display element.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-410558 filed on Dec. 9, 2003 and including specification, claims, drawings and summary. The disclosure of the above Japanese Patent Application is incorporated herein by reference in its entirety.

What is claimed is:

1. A projector apparatus comprising:
   a light source device which includes: (i) a light source lamp, (ii) a reflector in which the light source lamp is at least partially arranged, which has an opening through which light from the light source lamp is emitted, and which reflects light radiated from the light source lamp through the opening, and (iii) a transparent explosion-proof glass having a predetermined thickness, which is arranged ahead of the opening of the reflector, and which is obliquely inclined by a predetermined angle with respect to a plane perpendicular to an optical axis of the light emitted from the reflector;
   a display element which displays an image by controlling emission of received light;
   an optical system which causes light emitted from the light source device to be incident to the display element, and which comprises a light guiding rod which has: (i) a light entering area, at a first end of the rod, at which light enters the rod, (ii) a light emitting area, at a second end of the rod, from which light that enters the rod at the light entering area is emitted, and (iii) a center axis which coincides with an optical axis of light emitted from the explosion-proof glass, wherein the optical axis of the light emitted from the explosion-proof glass does not coincide with the optical axis of the light emitted from the reflector; and
   a projection lens which projects light emitted from the display element to a projection surface.

2. The projector apparatus according to claim 1, wherein the light guiding rod comprises a cylindrical rod and guides the light entering the rod at the light entering area to be emitted with a uniform distribution of intensity from the light emitting area.

3. The projector apparatus according to claim 1, wherein the optical system comprises a color wheel which includes red, green, and blue color filters arranged side by side in a circumferential direction of the color wheel, and which is driven to rotate such that the color filters sequentially cross a path of light emitted from the light source device.

4. The projector apparatus according to claim 1, wherein the predetermined angle at which the explosion-proof glass is inclined with respect to the plane perpendicular to the optical axis of the light emitted from the reflector is an angle at which light emitted from the opening of the reflector and reflected back toward the reflector by the explosion-proof glass is irradiated into the reflector such that the light does not converge on the light source lamp.

5. The projector apparatus according to claim 1, wherein the light source lamp comprises a glass bulb which is positioned inside the reflector; and
   wherein the predetermined angle at which the explosion-proof glass is inclined with respect to the plane perpendicular to the optical axis of the light emitted from the reflector is an angle at which light emitted from the opening of the reflector and reflected back toward the reflector by the explosion-proof glass is irradiated into the reflector such that the light does not converge on at least the glass bulb of the light source lamp.

6. The projector apparatus according to claim 1, wherein the predetermined angle at which the explosion-proof glass is inclined with respect to the plane perpendicular to the optical axis of the light emitted from the reflector is an angle at which light emitted from the opening of the reflector and reflected back toward the reflector by the explosion-proof glass does not converge on the light source lamp.

7. The projector apparatus according to claim 1, wherein the explosion-proof glass has a strength such that if the light source lamp explodes, pieces scattering from the exploded light source lamp are prevented from going outside the light source device.

8. The projector apparatus according to claim 1, wherein the explosion-proof glass reflects ultraviolet light.

9. The projector apparatus according to claim 1, wherein the explosion-proof glass comprises glass, an ultraviolet reflection film provided on a first surface of the glass, and a low reflexive film provided on a second surface of the glass.

10. The projector apparatus according to claim 1, further comprising a cylindrical cover, both ends of which are open, provided between the opening of the reflector and the explosion-proof glass such that a circumference of a first end of the cylindrical cover is coupled to a circumference of the opening of the reflector, and such that the explosion-proof glass is fitted in an inner circumference of a second end of the cylindrical cover.

* * * * *